Patented Jan. 23, 1940

2,188,013

UNITED STATES PATENT OFFICE 2,188,013

METHOD OF SEPARATING HIGH MOLECULAR MIXTURES

Stanislaw Pilat and Marian Godlewicz, Lwow, Poland, assignors to Shell Development Company, San Francisco, Calif., a corporation of Delaware No Drawing. Application April 27, 1936, Serial No. 76,604. Renewed May 1, 1939. In Poland February 6, 1933

20 Claims. (Cl. 196—13)

This invention pertains to a method of separating mixtures of high molecular substances into two or more fractions having different chemical and/or physical properties, and is a continuation-in-part of our application Serial No. 708,988 filed January 30, 1934.

Industrial materials which contain complex mixtures of organic or inorganic compounds may be separated into desirable fractions containing concentrates of one or more pure substances, or of one or more groups of substances which have similar physical properties and/or chemical compositions by many known methods, such as distillation, crystallization, treatment with selective solvents, adsorption, etc.

The known processes for effecting these separations have many limitations. For example, distillation methods often result in a decomposition of the materials being treated, and is, moreover, ineffective to separate substances having the same or almost the same vapor pressures; the degree of separation effected by crystallization methods and selective solvent extraction methods is such, that the products must often be further treated to obtain products of the desired purity; and considerable losses are often involved in the use of adsorption methods.

According to the present invention we provide a new and convenient method of separating high molecular mixtures into portions of different properties by means of gaseous carbon dioxide or a gas containing carbon dioxide and preferably of inert non-oxidizing character. Other objects of our invention will be apparent from a reading of the following specifications.

Our invention may, for example, be applied to the separation of liquid or meltable high molecular mixtures, or high molecular mixtures which may be brought into solution by the use of suitable solvents, such as crude mineral oils, their distillates or residues, mineral oil fractions obtained by extraction of petroleum oils, shale oils, and other hydrocarbon and non-hydrocarbon mixtures, like coal tar, coal tar oils, animal and vegetable oils, such as neat's foot oil, linseed oil, rapeseed oil, voltolized rapeseed oil and other mixtures of fatty acids, esters, phenols, alcohols, organic nitrogen-containing substances, chlor-derivatives, pharmaceutical preparations, preparations obtained from living organisms, such as, for example, hormones, and many other chemicals. The process may be applied to separate mixtures of different chemical classes of substances, or to free materials from impurities, or to separate members of homologous or analogous chemical groups. Thus, hydrocarbons may be separated from mixtures of hydrocarbons and the above non-hydrocarbons.

Our process is based upon our discovery that high molecular mixtures can be separated into portions containing substances of different molecular weights and/or chemical structure, by treating the mixture, while in the liquid state, under superatmospheric pressure with gaseous carbon dioxide under conditions which cause a lowering in the density of the mixture, thereby causing the mixture to "demix", i. e., to separate into two or more liquid phases of different densities, of which the lighter phase contains the greater part of carbon dioxide. Considerable advantages are inherent in our method of treatment, one of which is that relatively low pressures (far below liquefaction pressures of said gaseous substances) and ordinary or elevated temperatures (generally not exceeding 200° C.) may be employed in carrying out the process of our invention. No chemical changes are involved in separating mineral oils by the method of our invention, the treatment being a physical and not chemical type.

Briefly, the invention consists of introducing into a high molecular mixture gaseous carbon dioxide or a gas containing carbon under a superatmospheric pressure until a concentration is reached at which the mixture separates into two liquid phases of different specific gravities. Relative quantities and compositions of the components of the high molecular mixture in the phases are regulated by maintaining suitable treating temperatures and pressures, as well as by selecting or regulating the composition of the gaseous carbon dioxide.

The process can be modified by dissolving the mixture to be treated in a suitable solvent which may be of the type of known deasphalting agents, such as normally liquid or liquefied hydrocarbons, as propane, propylene, normal or iso-butanes, butylenes, normal or iso-pentanes, hexanes, or their mixture, light straight run naphthas, or other light aromatic-free fractions of mineral oil; or said solvent may be chosen from a group of what are known as selective or naphthenic solvents, such as liquid $SO_2$, furfural, nitrobenzene, chlorex, cresylic acid, phenol, aniline, and a large number of others, their mixtures, or solutions with diluents; we also found, that in practicing our invention auxiliary treating agents of the type of oil decolorizing agents, such as fuller's earth, naphthalene, phenanthrene, dinitrobenzene, and the like, may be advantageously used either instead of or in conjunction with deasphalting agents and/or selective solvents described hereinbefore.

In applying our invention to hydrocarbon oils, we prefer to dissolve the mineral oil distillate or residue to be treated in a deasphalting agent or in a naphthenic solvent or in a mixture of both, although our process is applicable in treating undissolved mineral oils. The purpose of dissolving the oil in a solvent is to modify the fractionating effect of the gaseous treating agent, because we found that compositions of the fractions obtained by our method of treating an oil, after first dissolving the oil in a solvent, are somewhat different from those obtained from undissolved oils; operating conditions, such as temperatures and pressures, under which carbon dioxide is introduced into the oils being separated into fractions, are also affected by the use of either deasphalting or other selective solvents in conjunction with our treatment.

In one form of our invention a solvent is added to the oil in such quantity as substantially to saturate the oil without causing it to separate into two phases at the temperature used in our treatment. The dissolved oil is then contacted with gaseous carbon dioxide under pressure, which is lower than the liquefaction pressure of the carbon dioxide at the corresponding temperature, to cause the gas to dissolve in the oil in the oil solution and saturate this solution with accompanying separation of a second heavier phase. The light and heavy phases produced in this manner may be separated by settling or in some other manner, without changing their compositions, and then separately treated to remove the solvents from the oil portions. If, however, the oil contains, as most of the distillation residues do, certain undesirale asphaltic or resinous materials, it is preferable in many cases to precipitate those materials first by dissolving the oil in a deasphalting agent, separate the precipitate from the oil solution and then treat the latter in accordance with our invention.

Another feature of our invention is that we have found that this method can be used to separate a mixture, and particularly oil, into a series of fractions by successive applications of the already described method of our invention. For example, after separating the primary light phase from the primary heavy phase, after producing these phases by saturating an oil solution with gaseous carbon dioxide, the separated primary light phase may be contacted with more carbon dioxide and substantially at the same temperature, or at a different temperature but under a higher pressure; thus, a further quantity of the carbon dioxide is forced into the primary light phase and it is caused to separate into two secondary phases of different compositions and gravities, which may be further treated in the already described manner. By repeating this treatment in a series of steps by using progressively increasing pressures, the treated oil or other mixture can be fractionated into portions having different properties. However, instead of subjecting one of the lighter phases (either primary, secondary or any other subsequent one) to a higher pressure than under which the phase was produced, it is also possible to effect the fractionation by maintaining the pressure of the gaseous carbon dioxide substantially constant, and to cause the separation of the oil solution saturated with the carbon dioxide into two new phases by changing its temperature. Either of the two methods may be used in a series of separations, or the two methods may alternate in a series of consecutive treatments.

It may be desirable in a series of consecutive treatments not only to vary the treating conditions, like pressures and temperatures, or the gaseous carbon dioxide, but also to modify the quantity or the composition of the solvent in which the mixture is dissolved, by adding, for example, more of the solvent already present in the solution, or by adding a new liquid or gaseous diluent or other solvent; for instance, liquid $SO_2$—benzol solution, chlorex (dichloroethyl ether) alone or in solution with benzol, or furfural-benzol solution may be used in conjunction with our invention.

Instead of pure carbon dioxide, we may employ gaseous mixtures of carbon dioxide and other low-molecular gases, such as carbon monoxide or hydrocarbons, particularly those having between one and four carbon atoms in the molecule. The addition of carbon dioxide to other low molecular gaseous treating agents, such as, for example, those disclosed in the above mentioned application, changes the character of the fractions obtained. While in most cases we prefer to employ upwards of 50% of carbon dioxide in the gas, considerably lower concentrations will often have a marked effect upon the fractionation.

We found it possible to separate by our method mineral oils into fractions of different chemical characteristics, as indicated, for example, by the temperature-viscosity relationships of different fractions, as well as of different boiling ranges,—the manner of separation being dependent on the solvent and/or gaseous treating agent used.

*Example I.*—One part by weight of a Coalinga residual oil, having a viscosity of 118 sec. Say. Univ. at 210° F. and a viscosity index of 14 was dissolved in 2.95 parts by weight of propane. $CO_2$ was pumped into the resulting solution in a pressure cylinder, which was maintained at 20° C., in several steps, thereby precipitating a series of heavier oil phases, each heavier phase being removed before more $CO_2$ was added to the remaining lighter liquid phase. Approximately 3.5 parts by weight of $CO_2$ were employed in all. The pressures at which the successive fractions were precipitated, their amounts and their properties are shown in Table I:

*Table I*

| Pressure, lbs./sq. in. gauge | Yield, percent by weight | Density $d_{20}^{20}$ | Refractive index $n_D^{20}$ |
| --- | --- | --- | --- |
| Orig. oil | 100 | 0.9672 | |
| 120 | 25 | | (a) |
| 240 | 5 | | (a) |
| 350 | 6 | | (a) |
| 440 | 9.5 | 0.9854 | 1.5554 |
| 540 | 12 | 0.9698 | 1.5411 |
| 635 | 11.5 | | 1.5299 |
| 750 (b) | 1 | 0.9497 | 1.5295 |
| 750 | 30 (c) | 0.9248 | 1.5113 |

(a) Asphalt; (b) cylinder full of liquid; (c) oil remaining in last light liquid phase.

*Example II.*—One part by weight of the Coalinga residual oil described in Example I was dissolved in 3.1 parts by weight of n-butane and similarly treated with gaseous $CO_2$ at 100° C., approximately 2.5 parts by weight of $CO_2$ being employed in the treatment. The results are shown in Table II.

Table II

| Pressure, lbs./sq. in. gauge | Yield, percent by weight | Density $d_{20}^{20}$ | Refractive index $n_D^{20}$ | Viscosity sec. Say. Univ. at 210° F. |
|---|---|---|---|---|
| Orig. oil | 100 | 0.9672 | | 118 |
| 265 | 5.5 | | | (a) |
| 350 | 2 | | | (a) |
| 490 | 2 | | | (b) |
| 700 | 6.5 | | | (b) |
| 825 | 6.5 | | | (b) |
| 950 | 11.5 | 0.9942 | 1.559 | 719 (c) |
| 1150 | 32.5 | 0.9689 | 1.542 | 213.4 (c) |
| 1250 | 12 | 0.9514 | 1.5289 | 106.4 (d) |
| 1250 | 21.5 (e) | 0.9336 | 1.5163 | 52.3 (f) |

(a) Hard asphalt; (b) asphalt; (c) dark oil; (d) green oil; (e) oil remaining in last light liquid phase; (f) yellow-green oil.

We are aware of the U. S. patent to Auerbach, No. 1,805,751 disclosing the extraction of oil with liquefied carbon dioxide. However, our invention, as described, is directed to the method of fractionating mineral oils under conditions at which the gaseous carbon dioxide is incapable of being liquefied. When higher pressures are necessary to effect the desired fractionation, our process may be operated at temperatures, which are above 31° C., the critical temperature of carbon dioxide.

We claim as our invention:

1. In a process of separating a liquid high molecular mixture into fractions having different properties, the steps of contacting the liquid mixture with a quantity of a gaseous precipitating agent containing a substantial concentration of carbon dioxide under superatmospheric pressure which is below the condensation pressure of said precipitating agent at the temperature of treatment, said quantity being sufficient to cause the formation of two liquid phases having different specific gravities, and separating the said liquid phases from one another.

2. In a process of separating a liquid hydrocarbon oil into oil fractions having different properties, the steps of contacting the liquid oil with a quantity of a gaseous precipitating agent containing a substantial concentration of carbon dioxide under superatmospheric pressure which is below the condensation pressure of said precipitating agent at the temperature of treatment, said quantity being sufficient to cause the formation of two liquid oil-containing phases having different specific gravities, and separating the said liquid phases from one another.

3. The process according to claim 2 in which the precipitating agent is substantially pure carbon dioxide.

4. In a process of separating a liquid high molecular mixture into fractions having different properties, the steps of contacting the liquid mixture with a quantity of a gaseous precipitating agent containing a substantial concentration of carbon dioxide under superatmospheric pressure at a temperature above the critical temperature of said precipitating agent, said quantity being sufficient to cause the formation of two liquid phases having different specific gravities, and separating the said liquid phases from one another.

5. In a process of separating a liquid hydrocarbon oil into oil fractions having different properties, the steps of contacting the liquid oil with a quantity of a gaseous precipitating agent containing a substantial concentration of carbon dioxide under superatmospheric pressure at a temperature above the critical temperature of said precipitating agent, said quantity being sufficient to cause the formation of two liquid oil-containing phases having different specific gravities, and separating the said liquid phases from one another.

6. The process according to claim 5 in which the precipitating agent is substantially pure carbon dioxide.

7. In a process of separating a liquid high molecular mixture into fractions having different properties, the steps of dissolving said mixture in a low boiling liquid which is a mutual solvent for said mixture and for carbon dioxide at the temperature of treatment, contacting the resulting liquid solution with a quantity of a gaseous precipitating agent containing a substantial concentration of carbon dioxide under superatmospheric pressure below the condensation pressure of said precipitating agent at the temperature of treatment, said quantity being sufficient to cause the formation of two liquid phases of different specific gravities, and separating said liquid phases from one another.

8. In a process of separating a liquid hydrocarbon oil into oil fractions having different properties, the steps of dissolving said oil in a low boiling liquid which is a mutual solvent for said oil and for carbon dioxide at the temperature of treatment, contacting the resulting liquid solution with a quantity of a gaseous precipitating agent containing a substantial concentration of carbon dioxide under superatmospheric pressure below the condensation pressure of said precipitating agent at the temperature of treatment, said quantity being sufficient to cause the formation of two liquid oil containing phases of different specific gravities, and separating said liquid phases from one another.

9. In a process of separating a liquid high molecular mixture into fractions having different properties, the steps of dissolving said mixture in a low boiling liquid which is a mutual solvent for said mixture and for carbon dioxide at the temperature of treatment, contacting the resulting liquid solution with a quantity of a gaseous precipitating agent containing a substantial concentration of carbon dioxide under superatmospheric pressure at a temperature above the critical temperature of said precipitating agent, said quantity being sufficient to cause the formation of two liquid phases of different specific gravities, and separating said liquid phases from one another.

10. In a process of separating a liquid hydrocarbon oil into oil fractions having different properties, the steps of dissolving said oil in a low boiling liquid which is a mutual solvent for said oil and for carbon dioxide at the temperature of treatment, contacting the resulting liquid solution with a quantity of a gaseous precipitating agent containing a substantial concentration of carbon dioxide under superatmospheric pressure at a temperature above the critical temperature of said precipitating agent, said quantity being sufficient to cause the formation of two liquid oil containing phases of different specific gravities, and separating said liquid phases from one another.

11. The process according to claim 10 in which the precipitating agent is substantially pure carbon dioxide.

12. In a process of separating a liquid hydrocarbon oil into oil fractions having different properties, the steps of dissolving said oil in a liquid selective naphthenic solvent, contacting the resulting liquid solution with a quantity of a gaseous precipitating agent containing a substantial concentration of carbon dioxide under superatmospheric pressure below the condensation pressure of said precipitating agent at the temperature of treatment, said quantity being sufficient to cause the formation of two liquid oil-containing phases of different specific gravities having compositions different from the said solution, and separating the said liquid phases from one another.

13. In a process of separating a liquid hydrocarbon oil into oil fractions having different properties, the steps of dissolving said oil in a liquid selective naphthenic solvent, contacting the resulting liquid solution with a quantity of a gaseous precipitating agent containing a substantial concentration of carbon dioxide under superatmospheric pressure at a temperature above the critical temperature of said precipitating agent, said quantity being sufficient to cause the formation of two liquid oil-containing phases of different specific gravities having compositions different from the said solution, and separating the said liquid phases from one another.

14. The process according to claim 13 in which the concentration of oil and solvent is such that the resulting liquid solution is capable of existing as a substantially homogeneous liquid phase at the temperature of treatment with the precipitating agent.

15. The process according to claim 13 in which the precipitating agent is substantially pure carbon dioxide.

16. In a process of separating a liquid high molecular mixture into a plurality of fractions having different properties, the steps of contacting the liquid mixture with a quantity of a gaseous precipitating agent containing a substantial concentration of carbon dioxide under superatmospheric pressure which is below the condensation pressure of said precipitating agent at the temperature of treatment, said quantity being sufficient to cause the formation of two liquid phases having different specific gravities, separating the said liquid phases from one another, introducing an additional quantity of a gaseous precipitating agent containing a substantial concentration of carbon dioxide into the lighter separated liquid phase under superatmospheric pressure which is below the condensation pressure of the added precipitating agent at the temperature of treatment, said added quantity being sufficient to cause the formation of two new liquid phases having different specific gravities, and separating said new liquid phases from one another.

17. In a process of separating a liquid high molecular mixture into a plurality of fractions having different properties, the steps of contacting the liquid mixture with a quantity of a gaseous precipitating agent containing a substantial concentration of carbon dioxide under superatmospheric pressure at a temperature above the critical temperature of said precipitating agent, said quantity being sufficient to cause the formation of two liquid phases having different specific gravities, separating the said liquid phases from one another, introducing an additional quantity of a gaseous precipitating agent containing a substantial concentration of carbon dioxide into the lighter separated liquid phase under superatmospheric pressure at a temperature above the critical temperature of the added precipitating agent, said added quantity being sufficient to cause the formation of two new liquid phases having different specific gravities, and separating said new liquid phases from one another.

18. In a process of separating a liquid high-molecular mixture into fractions having different properties, the steps of subjecting the mixture to the solvent action of a liquid solvent and to precipitating action of gaseous carbon dioxide dissolved therein under conditions to form two liquid phases and separating one liquid phase from another.

19. In a process of separating a liquid hydrocarbon mixture into fractions having different properties, the steps of subjecting the mixture to the solvent action of a liquid solvent and to precipitating action of gaseous carbon dioxide dissolved therein under conditions to form two liquid phases and separating one liquid phase from another.

20. In a process of separating a liquid hydrocarbon mixture into fractions having different properties, the steps of subjecting the mixture to the solvent action of a liquid hydrocarbon solvent and to precipitating action of gaseous carbon dioxide dissolved therein under conditions to form two liquid phases and separating one liquid phase from another.

STANISLAW PILAT.
MARIAN GODLEWICZ.